United States Patent [19]
Saunders

[11] Patent Number: 5,529,365
[45] Date of Patent: Jun. 25, 1996

[54] TRIM EDGING FOR MOTORCYCLE FAIRING

[76] Inventor: Charles A. Saunders, 8380 36th Ave., Columbus, Nebr. 68601

[21] Appl. No.: 394,240

[22] Filed: Feb. 24, 1995

[51] Int. Cl.⁶ .................................................. B62J 17/04
[52] U.S. Cl. ........................................ 296/78.1; 296/208
[58] Field of Search ......................... 296/78.1, 93, 208, 296/213; 52/204.597, 716.2, 716.5, 11; 49/476.1

[56] References Cited

U.S. PATENT DOCUMENTS

| | | | |
|---|---|---|---|
| 1,387,349 | 8/1921 | Campbell | 296/78.1 |
| 1,729,086 | 9/1929 | Premont | 296/78.1 |
| 3,578,264 | 5/1971 | Kuethe | 244/41 |
| 3,596,980 | 8/1971 | Cadiou | 49/476.1 X |
| 4,023,853 | 5/1977 | Oguma et al. | 296/78.1 |
| 4,066,291 | 1/1978 | Hickman | 296/78.1 |
| 4,385,010 | 5/1983 | Bosne | 52/11 X |
| 4,452,483 | 6/1984 | Kano et al. | 296/213 |
| 4,514,006 | 4/1985 | Maruoka | 296/78.1 |
| 4,772,066 | 9/1988 | Leschke | 296/208 |
| 5,022,705 | 6/1991 | Takahashi | 296/213 |
| 5,300,346 | 4/1994 | Tamura et al. | 428/156 |

FOREIGN PATENT DOCUMENTS

| | | | |
|---|---|---|---|
| 3017732 | 11/1981 | Germany | 296/208 |
| 3936372 | 5/1991 | Germany | 296/208 |
| 1269491 | 4/1972 | United Kingdom . | |

OTHER PUBLICATIONS

SAENG Touring Accessories Corp. U.S.A. Brochure—Dec. 20, 1993.

Primary Examiner—Dennis H. Pedder
Attorney, Agent, or Firm—Zarley, McKee, Thomte, Voorhees & Sease; Mark D. Frederiksen

[57] ABSTRACT

A trim edging for a fairing includes an elongated body having a base portion adapted for attachment on a fairing, with a forward surface extending upwardly from the base, and a rearward surface extending upwardly to connect with an upper of the forward surface. The forward surface of the trim edging includes a lower portion sloped upwardly and rearwardly from the base, a central portion extending rearwardly, upwardly and thence forwardly from the lower portion, and an upper portion extending from the central portion to the upper edge. A depending tooth which extends the transverse length of the elongated body is formed in the forward surface at the juncture of the central portion and upper portion.

12 Claims, 3 Drawing Sheets

5,529,365

TRIM EDGING FOR MOTORCYCLE FAIRING

TECHNICAL FIELD

The present invention relates generally to trim pieces for motorcycle fairings, and more particularly to an improved trim piece for motorcycle fairings which generates waves in airflow to reduce noise in the open cockpit of a motorcycle, and which drains rainwater from the fairing surface.

BACKGROUND OF THE INVENTION

In open cockpit vehicles, such as motorcycles, a fairing or windshield of curved clear plastic is typically provided to protect the rider from wind and rain.

Although conventional fairings protect the rider from wind, typically, such fairings produce high wind noise which increases with the speed of travel. As a motorcycle moves forwardly, air is forced upwardly from the leading edge of the fairing and thence rearwardly over an upper trailing edge of the fairing. In addition, wind is directed outwardly towards each side around the motorcycle cockpit. Typically, the airstream swings downwardly and into the cockpit after it reaches the fairings trailing edge. This airstream collides with the cockpit's internal air pattern to create a chaotic flow, known as buffeting to motorcyclists. Buffeting can cause the motorcyclist's helmet to shake to such an extent as to effect the ability to see. In addition, high and erratic noise level is associated with this chaotic flow, which can be very disruptive to the rider.

The inventor herein has discovered that the provision of a projecting trim piece along the side edges and upper trailing edge of the motorcycle fairing will interrupt the airflow over the fairing so as to substantially decrease buffeting in the open cockpit area. While the problem of buffeting was substantially reduced by prior art trim pieces, the inventor has found that rainwater flowing off the fairing can accumulate and spill over the trim piece, causing problems to the rider. The inventor has also found that conventional gutter strips do not necessarily eliminate this problem.

SUMMARY OF THE INVENTION

It is therefore a general object of the present invention to provide an improved trim piece for motorcycle fairings which reduces buffeting and reduces spillage of rainwater into the cockpit of an open cockpit vehicle.

Another object is to provide a trim piece for a motorcycle fairing which drains rainwater and which may be easily attached to conventional fairings or extension pieces for fairings.

Still another object is to provide a fairing trim piece which is economical to manufacture, refined in appearance, and simple to install.

These and other objects will be apparent to those skilled in the art.

The trim edging for a fairing of the present invention includes an elongated body having a base portion adapted for attachment on a fairing, with a forward surface extending upwardly from the base, and a rearward surface extending upwardly to connect with an upper of the forward surface. The forward surface of the trim edging includes a lower portion sloped upwardly and rearwardly from the base, a central portion extending rearwardly, upwardly and thence forwardly from the lower portion, and an upper portion extending from the central portion to the upper edge. A depending tooth which extends the transverse length of the elongated body is formed in the forward surface at the juncture of the central portion and upper portion.

DESCRIPTION OF THE PREFERRED EMBODIMENT

Figure 1:
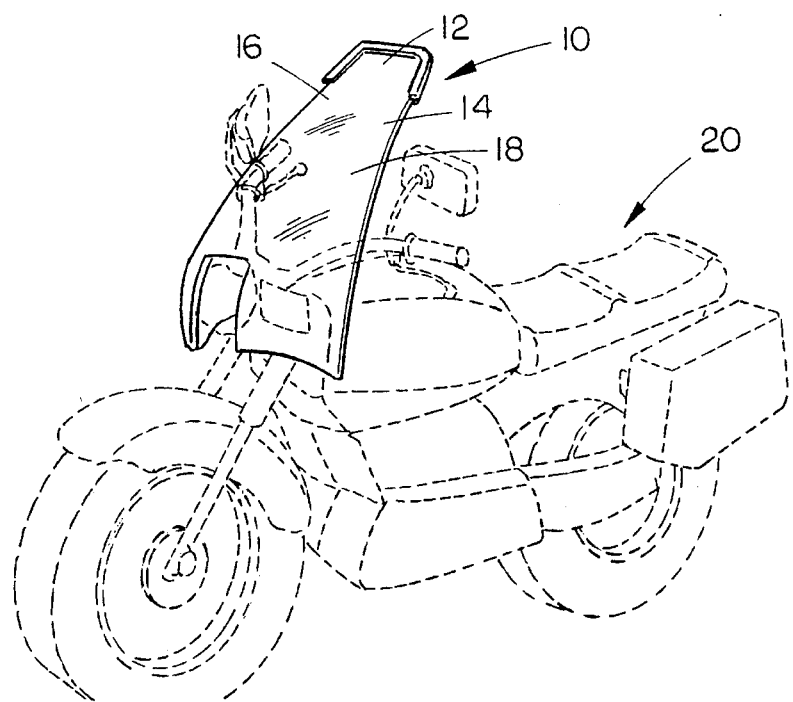
FIG. 1 is a perspective view of a motorcycle (shown in dashed lines) having a fairing and the trim piece of the present invention installed thereon.

Referring now to the drawings, in which similar or corresponding parts are identified with the same reference numeral, and more particularly to FIG. 1, the fairing trim of the present invention is designated generally at 10 and is shown attached to the upper trailing edge 12 and portions of the side trailing edges 14 and 16 of a motorcycle fairing 18. While trim 10 is shown mounted on a fairing 18 on a motorcycle 20, it should be understood that the trim may be utilized on fairings for other types of open cockpit vehicles.

Figure 2:
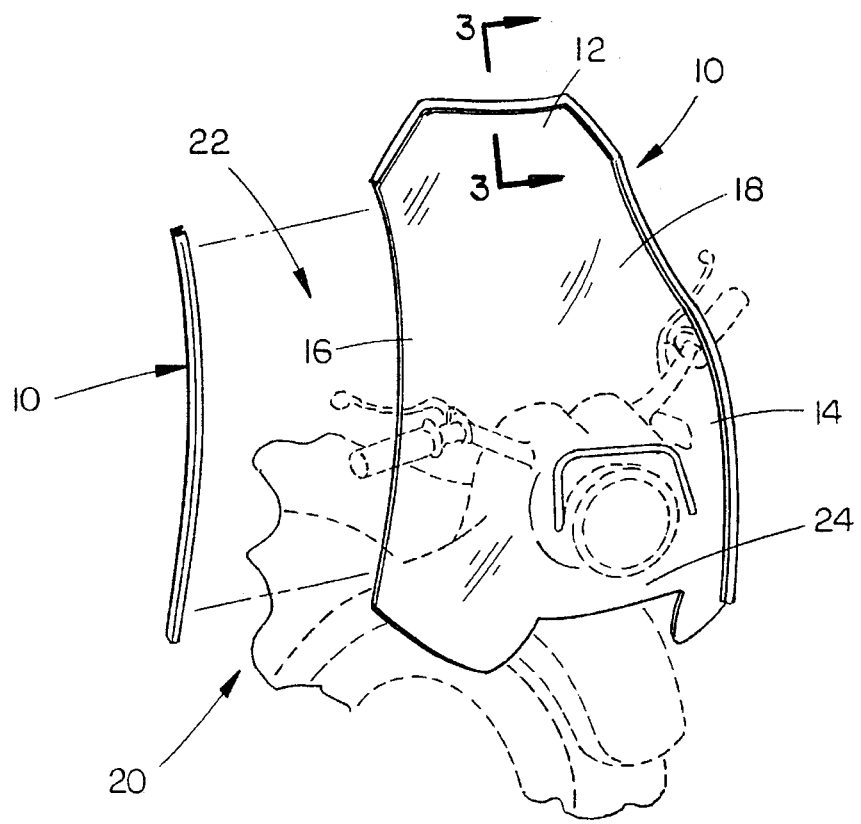
FIG. 2 is an enlarged perspective view of a fairing with the trim piece of the present invention thereon.

Referring now to FIG. 2, fairing 18 is typically formed of a clear plastic material and attached to the frame or handlebars of the motorcycle 20, directly forwardly of the open cockpit area, designated generally at 22. FIG. 2 shows that trim 10 may be installed along the entire length of upper trailing edge 12 as well as side trailing edges 14 and 16, to prevent air buffeting and rainwater spillage therealong. For ease of description, the lower forward edge 24 of fairing 18 will be described as the leading edge 24, while the upper rearward edge of fairing 18 will be described as the trailing edge 12, throughout this application.

Figure 3:
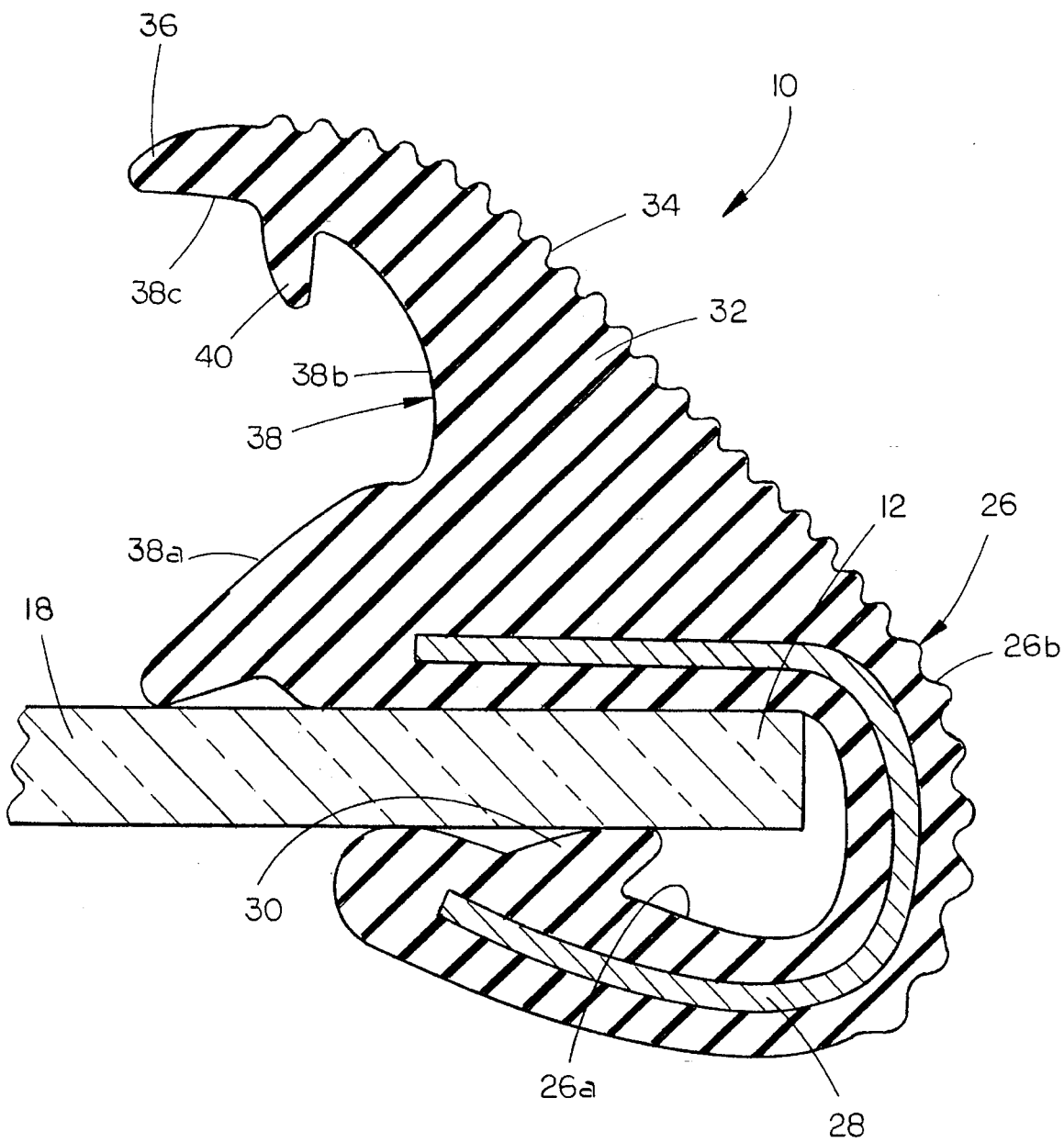
FIG. 3 is an elongated cross-sectional view taken at lines 3—3 in FIG. 2.

Referring now to FIG. 3, fairing trim 10 includes a generally U-shaped base portion 26 with an interior surface 26a designed to receive the trailing edge 12 (or trailing side edges 14 and 16, as shown in FIG. 2) of fairing 18. A malleable aluminum U-shaped insert 28 is preferably embedded within base 26 to provide clamping force on fairing 18. An inwardly projecting lip 30 assists in gripping the trailing edge 12 of fairing 18, in a conventional fashion.

For purposes of description, fairing 18 will be considered horizontal. Fairing trim 10 includes a body portion 32 which projects upwardly from the upper leg of base 26. Body 32 includes a rearward surface 34 which extends forwardly and upwardly from tangent to a rearward surface 26b of base 26. Preferably, rearward edge 34 of body 32 extends forwardly at an angle of approximately 47°, and curves to horizontal at an upper edge 36. Body portion 32 also includes a forward surface 38 which extends from fairing 18 (and the upper leg of base 26) to upper edge 36. Forward surface 38 includes three significant portions. A lower portion 38a extends upwardly and rearwardly at a slope of approximately 45°. At the upper end of lower portion 38a, a curved channel portion 38b curves upwardly and thence forwardly. At the upper end of channel portion 38b, an upper portion 38c continues forwardly and generally horizontally to join with upper edge 36 of body 32.

At the approximate juncture of upper portion 38c and channel portion 38b of forward surface 38, a depending tooth 40 is formed in forward surface 38. Tooth 40 forms an acute angle with the channel portion 38b and projects generally orthogonally to the surface of fairing 18. Without depending tooth 40, rainwater typically flows up lower portion 38a, into channel portion 38b, and would then drain off to the sides. However, the conventional channel cannot handle periodic "surges" of water which can occur during rainstorms. This extra surge of water sloshes over upper edge 36, and into the occupant, in conventional trim channels. The inventor herein has found that the installation of tooth 40 will cause the inertial mass of such a surge to be redirected downwardly back upon itself, to thereby "break" the surge, and distribute the water along the channel.

Figure 5:
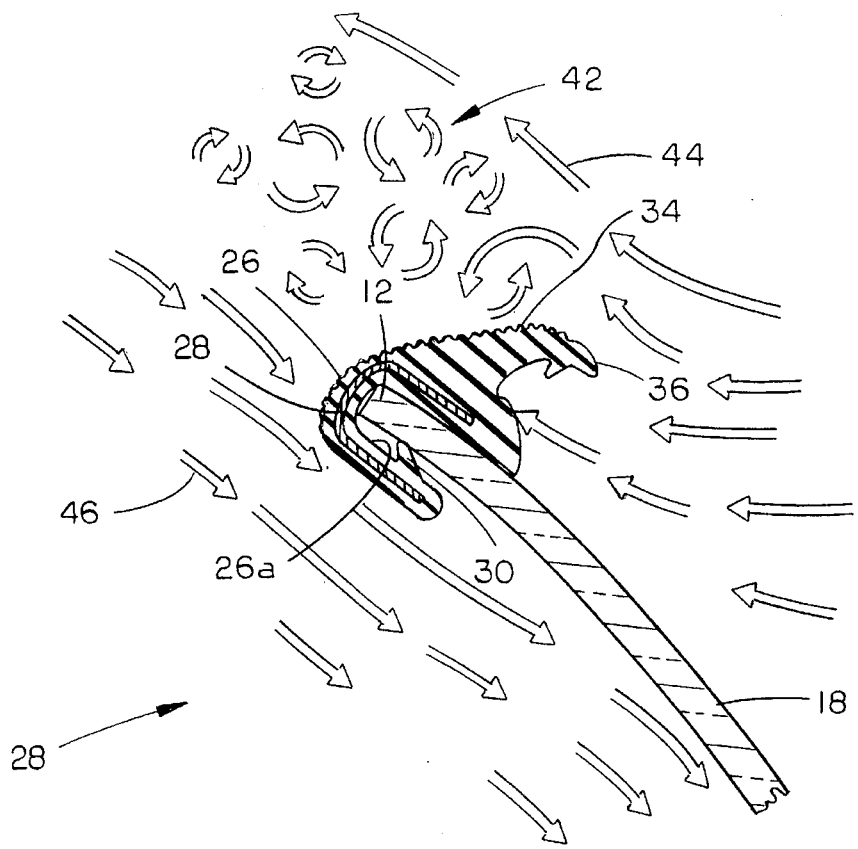
FIG. 5 is a cross-sectional view of the present invention installed on a fairing and showing the capture of rainwater by the trim piece.
Figure 4:
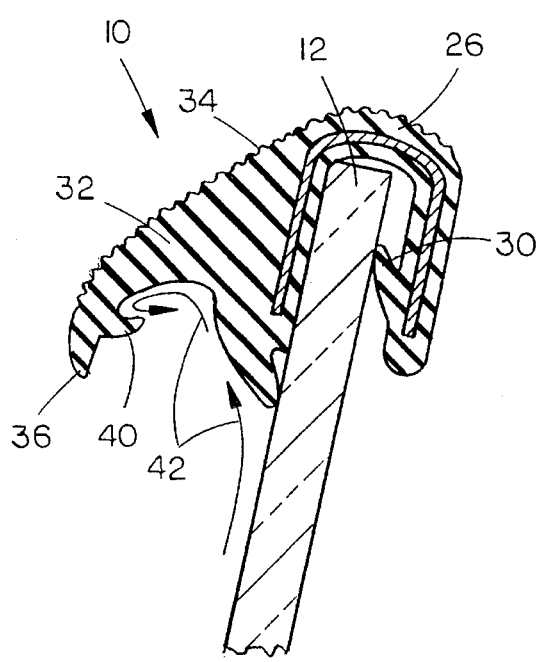
FIG. 4 is a cross-sectional view showing the air wave generation caused by the fairing trim of the present invention.

Rearward surface 34 is provided with a wave-like ribbing texture, which assists in generating waves in the airstream flowing thereover, as shown more specifically in FIG. 5. Thus, upper edge 36 disrupts airflow in the airstream moving along fairing 18 towards trailing edge 12, while ribbed rearward surface 34 "grips" the disrupted airflow to roll a section of the airstream into a tight layer of turbulence, designated generally at 42, which forms a barrier preventing the main airstream 44 from chaotically colliding with the airstream 46 within cockpit 28. With this barrier in place, the main airstream 44 does not develop into a buffeting pattern as exhibited in the prior art. This results in a dramatic reduction in wind noise within the open cockpit area 28.

Figure 6:
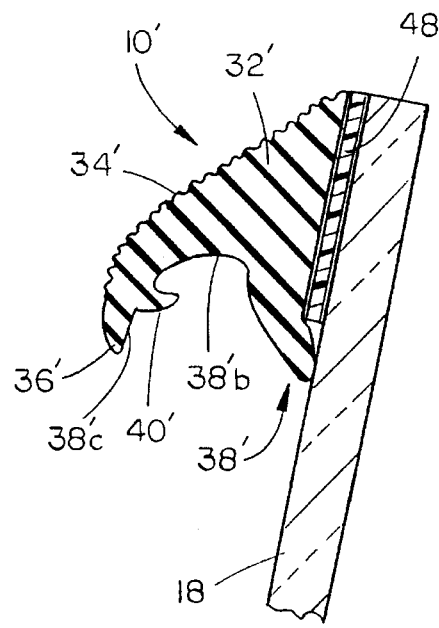
FIG. 6 is a cross-sectional view of a second embodiment of the invention.

Referring now to FIG. 6, a second embodiment of the invention is designated generally at 10' which includes an identical body portion 32' as the first embodiment of the invention, but is attached to fairing 18 (or an extension to the fairing utilizing an adhesive strip 48). Fairing trim 10' still includes the critical portions of the invention, including the upper edge 36', a depending tooth 40' located between the upper and channel portions 38'c and 38'b of the forward surface 38', and a ribbed rearward surface 34'.

Whereas the invention has been shown and described in connection with the preferred embodimnt thereof, many modifications, substitutions and additions may be made which are within the intended broad scope of the appended claims.

I claim:

1. Trim edging for a fairing viewed in a horizontal orientation, said fairing having a generally horizontal upper surface and a rearwardly extending trailing edge, comprising:

an elongated body attached continuously along said fairing trailing edge;

said body having a forward surface extending from the fairing to an upper edge, and a rearward surface extending upwardly from the fairing and forwardly to the upper edge;

said forward surface including:
      a lower portion sloping upwardly and rearwardly;
      a central portion extending rearwardly, thence upwardly, thence forwardly; and
      an upper portion extending forwardly from the central portion to the upper edge; and said forward surface including a depending tooth extending the transverse length of said body, projecting towards and generally orthogonal to the fairing upper surface, and located to form a juncture between the central portion and upper portion of the forward surface.

2. The trim edging of claim 1, further comprising a generally U-shaped base with the trailing edge of the fairing gripped therein.

3. The trim edging of claim 1, wherein said forward surface central portion is curvilinear from the forward surface lower portion to the tooth and wherein said forward surface central portion joins the tooth at an acute angle.

4. The trim edging of claim 1, wherein said forward surface upper portion is generally parallel to the forward surface of the fairing.

5. The trim edging of claim 1, wherein said rearward surface slopes forwardly from adjacent the fairing trailing edge to the body upper edge.

6. The trim edging of claim 5, wherein said rearward surface slopes at an angle of approximately 47° relative to the fairing.

7. The trim edging of claim 1, wherein said rearward surface includes a plurality of spaced-apart, parallel, ribs extending the length of the trim piece.

8. Trim edging for a fairing, comprising:

an elongated body having a generally horizontally oriented base surface, a forward surface extending upwardly from the base to an upper edge, and a rearward surface extending upwardly from the base to the upper edge;

said forward surface including:
      a lower portion extending upwardly and rearwardly;
      a central portion extending rearwardly, thence upwardly, thence forwardly; and
      an upper portion extending forwardly from the central portion to the upper edge; and said forward surface including a depending tooth extending the transverse length of the body and located at a juncture of the central portion and upper portion of the forward surface.

9. The trim edging of claim 8, wherein said forward surface central portion is curvilinear from the forward surface lower portion to the tooth and wherein said forward surface central portion joins the tooth at an acute angle.

10. The trim edging of claim 8, wherein said forward surface upper portion is oriented generally parallel to the base.

11. The trim edging of claim 8, wherein said rearward surface slopes forwardly from a rearward edge of the base to the body upper edge.

12. The trim edging of claim 8, wherein said rearward surface includes a plurality of spaced-apart, parallel ribs extending the length of the body.

* * * * *